US010666932B2

(12) United States Patent
Coni et al.

(10) Patent No.: US 10,666,932 B2
(45) Date of Patent: May 26, 2020

(54) MORE RELIABLE MONOCHROMATIC STEREOSCOPIC IMAGE PROJECTOR

(71) Applicant: THALES, Courbevoie (FR)

(72) Inventors: Philippe Coni, St Jean D'illac (FR); Aude Gueguen, Bordeaux (FR); Matthieu Grossetete, Cenon (FR)

(73) Assignee: THALES, Courbevoie (FR)

( * ) Notice: Subject to any disclaimer, the term of this patent is extended or adjusted under 35 U.S.C. 154(b) by 283 days.

(21) Appl. No.: 15/475,061

(22) Filed: Mar. 30, 2017

(65) Prior Publication Data
US 2017/0289531 A1    Oct. 5, 2017

(30) Foreign Application Priority Data

Apr. 1, 2016    (FR) ...................... 16 00546

(51) Int. Cl.
H04N 13/363    (2018.01)
H04N 13/279    (2018.01)
(Continued)

(52) U.S. Cl.
CPC ........... H04N 13/363 (2018.05); B64D 43/00 (2013.01); G02B 27/0101 (2013.01);
(Continued)

(58) Field of Classification Search
CPC .. H04N 13/363; H04N 13/279; H04N 13/365; H04N 13/324; H04N 13/344; H04N 13/341; H04N 13/334
(Continued)

(56) References Cited

U.S. PATENT DOCUMENTS 6,283,597 B1    9/2001 Jorke
2010/0201790 A1*   8/2010 Son ................ G02B 27/2264
348/53
(Continued)

FOREIGN PATENT DOCUMENTS

EP    2 998 782 A1    3/2016

OTHER PUBLICATIONS

French Search Report for French Counterpart Application No. FR 1600546, 8 pgs. (dated Dec. 15, 2016).

Primary Examiner — Sath V Perungavoor
Assistant Examiner — Kristin Dobbs
(74) Attorney, Agent, or Firm — Womble Bond Dickinson (US) LLP

(57) ABSTRACT

The general field of the invention is that of monochromatic stereoscopic image projectors including two light sources that illuminate two imagers, the radiation of the two light sources having a spectral distribution centred on a central wavelength, the first imager and the second imager being connected to a generator of stereoscopic image pairs. The image projector includes a dichroic separating filter that transmits the portion of the spectrum below the central wavelength and that reflects the portion of the spectrum above this central wavelength. The first light source and the second light source are arranged symmetrically on either side of the dichroic separating filter. The image projector operates cyclically, each cycle including two alternations. Each alternation consists in changing the emission source and in switching to the two displays the left and right images emitted by the generator of image pairs.

10 Claims, 4 Drawing Sheets

(51) Int. Cl.
| | |
|---|---|
| *H04N 13/334* | (2018.01) |
| *G02B 27/01* | (2006.01) |
| *H04N 13/341* | (2018.01) |
| *G02B 30/23* | (2020.01) |
| *G02B 30/24* | (2020.01) |
| *H04N 13/365* | (2018.01) |
| *H04N 13/324* | (2018.01) |
| *H04N 13/344* | (2018.01) |
| *B64D 43/00* | (2006.01) |

(52) U.S. Cl.
CPC ............ *G02B 30/23* (2020.01); *G02B 30/24* (2020.01); *H04N 13/279* (2018.05); *H04N 13/324* (2018.05); *H04N 13/334* (2018.05); *H04N 13/341* (2018.05); *H04N 13/344* (2018.05); *H04N 13/365* (2018.05); *G02B 2027/0114* (2013.01); *G02B 2027/0118* (2013.01); *G02B 2027/0134* (2013.01); *H04N 2213/001* (2013.01); *H04N 2213/008* (2013.01)

(58) Field of Classification Search
USPC .......................................................... 348/47
See application file for complete search history.

(56) References Cited

U.S. PATENT DOCUMENTS

| | | | |
|---|---|---|---|
| 2010/0208041 | A1* | 8/2010 | Savvateev .......... G02B 27/2207 348/51 |
| 2011/0205494 | A1 | 8/2011 | Richards et al. |
| 2012/0224036 | A1 | 9/2012 | Marcus et al. |
| 2013/0215235 | A1* | 8/2013 | Russell ................. G03B 35/00 348/47 |
| 2013/0242534 | A1 | 9/2013 | Pettitt et al. |
| 2013/0342904 | A1 | 12/2013 | Richards |
| 2014/0022637 | A1 | 1/2014 | Richards et al. |
| 2014/0043374 | A1* | 2/2014 | Yanai .................... G03B 21/16 345/690 |

\* cited by examiner

T=T0

T=T0 + T/2

MORE RELIABLE MONOCHROMATIC STEREOSCOPIC IMAGE PROJECTOR

FIELD

The field of the invention is that of displaying systems allowing an image to be presented in superposition with the exterior world. The technical applications are mainly in assistance with the control of vehicles. The invention most particularly applies to the field of aircraft flight-instrument panels, in which the pilot needs to be able to see the exterior and simultaneously read flight-control information and information relating to the navigation of the aircraft. The invention may also apply to any type of command and control system displaying symbols in superposition on a natural exterior environment. This is for example the case of control towers or of the bridge-control consoles of ships. The exterior environment may also be simulated. This is the case for flight simulators or platforms for controlling and steering drones.

BACKGROUND

There are various types of displaying systems allowing a synthetic image to be superposed on an exterior environment. One possible solution illustrated in FIG. 1 consists in implementing a stereoscopic image projector. The displaying system 10 then comprises:
- what is called a "3D" stereoscopic image projector 11 capable of generating at least two images, called the "right eye"/"left eye" image, representative of a given object. In the case of FIG. 1, the object is a sphere S.
- a scattering semi-transparent screen 12 onto which the "right eye"/"left eye" images are projected;
- a pair of glasses 13 including means for separating the "right eye"/"left eye" images and first detecting means 14, and intended to be worn by a user;
- second detecting means 15 associated with a fixed coordinate system R and that, associated with the first detecting means 14, allow the spatial position of the pair of glasses 13 in this fixed coordinate system to be detected;
- an electronic processor 16 performing at least the following functions:
  - acquisition of signals generated by the detecting means 14 and/or 15 and computation of the position of the pair of glasses;
  - computation of the position of the stereoscopic image corresponding to the position of the pair of glasses;
  - computation of the two right eye/left eye images.

There are various means for ensuring the stereoscopic separation of the projected images.

In a first technical solution, temporal separation is used. The projector sequentially projects and in a synchronized manner first the right eye image then the left eye image. The glasses are active and include active shutters that are synchronized with the projector. Thus, each eye perceives the image that is intended therefor and only said image. The shutters are generally based on a liquid-crystal technology. This solution has a number of drawbacks.

Since the glasses are active they require a power supply and control electronics, this posing maintenance problems in the context of an on-board use. In addition, the polarizers of the LCD shutters cause darkening of the cockpit displays and may even completely occult them, depending on the various polarization directions and the inclination of the glasses. Lastly, the presence of polarizers and the left-right vision alternation required to achieve the stereoscopic vision leads to a substantial loss of light. Thus the transmission of the glasses does not exceed 30%, this causing an unacceptable darkening of the exterior landscape.

In a second technical solution, the stereoscopic projector operates in a polarized mode. It emits successively and periodically a right eye image with a first polarization and a left eye image with a second polarization that is different from the first polarization. The pair of glasses 13 is passive. It includes a first polarized lens that is transparent to the first polarization and opaque to the second polarization, and a second polarized lens that is transparent to the second polarization and opaque to the first.

Such polarizer glasses are passive and solve the problem of alternate occultation of each eye, and the management of batteries. In contrast, it is absolutely necessary to use a silvered projection screen that preserves polarization. Since such screens are not transparent, they are not suitable for the applications to which the invention relates.

In a third technical solution, the projector emits two colour images the emission spectra of which are distinct. The pair of glasses includes two different filters, the first transmits the first spectrum and filters the second spectrum. The second filter has the inverse function. Thus, each eye perceives one and only one colour image and only said image. This technique is known as anaglyph. The simplest way of producing an anaglyph is to separate the visible spectrum into two portions, one red and the other blue. The obvious advantage of the device is its great implementational simplicity, but vision of the exterior world is greatly degraded.

More advanced, the system referred to as spectral multiplexing separates the visible spectrum into two interlaced portions, one dedicated to each eye. However, if the colours of the landscape are to be preserved as well can be, luminance is considerably decreased. The patent applications of the company "Dolby Laboratories Licensing Corporation" US 2011/0205494, US 2013/0342904 and US 2014/0022637 describe solutions of this type for cinematographical applications that require neither high light levels nor, of course, an exterior landscape to be transmitted.

For a certain number of applications, the use of colour images is not necessary. In the field of the superposition of images on an exterior landscape, it may be preferable to use a monochromic symbology that will stand out perfectly on the exterior background rather than a colour image that risks introducing confusion into the perception of the landscape. The image projector according to the invention implements monochromic stereoscopic images emitted at wavelengths that are different but sufficiently dose to give the same visual colour sensation. One of the difficulties of this method consists in finding light sources that are similar enough that their visual appearance is substantially the same and that are sufficiently separate that they are spectrally separable without difficulty and without excessive efficiency loss. Lastly, these light sources must meet aeronautical standards.

A first solution, illustrated in FIG. 2, is based on the spectral transmission properties of interference filters as a function of incidence. The projector 11 then includes:
- an interference filter 22 placed in front of the imager 20, which is illuminated by a source 21 the spectral transmission of which includes at least one transmission band of set width centred on a wavelength, said wavelength depending on the incidence of the light on said interference filter, and;
- means, symbolized by the semi-circular arrow, allowing the angular position of the filter to be varied between two set positions so as to transmit, in the first position, a first spectral band and, in the second position, a second spectral band.

A second solution is illustrated in FIG. 3. It consists in using two light sources 31 and 35 that are identical but filtered differently so as to let two neighbouring spectral bands pass. The first source 31, which is filtered by the filter 32, illuminates a first imager 30 and first optics 33, this first assembly being dedicated to the formation of the right stereoscopic image, and the second source 35, which is filtered by the filter 36, illuminates a second imager 34 and second optics 37, this second assembly being dedicated to the formation of the left stereoscopic image.

SUMMARY

One of the drawbacks of these two solutions is that their photometric efficiencies are not excellent. The stereoscopic image projector according to the invention does not have these drawbacks. It also implements two light sources to form the stereoscopic images but the photometric losses are much lower. Specifically, the light lost in one of the two stereoscopic channels is recycled in the second stereoscopic channel. Furthermore, the cyclic operation of the emission sources allows their instantaneous emitted power to be increased. More precisely, the subject of the invention is a monochromic stereoscopic image projector including a first light source, a second light source, a first imager and a second imager, the radiation of the two light sources having the same spectral distribution centred on a central wavelength, the first imager and the second imager being connected to a generator of stereoscopic image pairs, each pair comprising what is called a "left" image and what is called a "right" image;

characterized in that:
the image projector includes a dichroic separating filter that transmits the portion of the spectrum emitted by the light sources below the central wavelength and that reflects the portion of the spectrum emitted by the light sources above the central wavelength, or vice versa;
the first light source and the second light source are arranged symmetrically on either side of the dichroic separating filter and are arranged so as to illuminate the first and the second imager;
the image projector operates cyclically, each cycle including two alternations,
in the first alternation, the image generator emits a first pair of stereoscopic images including a first left image and a first right image, the first left image being displayed by the first display and the first right image being displayed by the second display, the first light source is activated and the second light source is turned off,
in the second alternation, the image generator emits a second pair of stereoscopic images including a second left image and a second right image, the first left image being displayed by the second display and the second right image being displayed by the first display, the first light source is turned off and the second light source is activated.

Advantageously, the first light source and the second light source are light-emitting diodes, the central wavelength being located at about 530 nanometres.

Advantageously, the frequency of the cycle is comprised between 100 Hz and 400 Hz.

Advantageously, the first display and the second display are DMD micromirror displays.

The invention also relates to a displaying system associated with the image projector such as defined above. This system includes means for generating stereoscopic images of a preset object, a device for displaying said stereoscopic images including said aforementioned stereoscopic image projector and a semi-transparent screen and a pair of stereoscopic glasses, the means for generating stereoscopic images, the displaying device, the semi-transparent screen and the pair of stereoscopic glasses being arranged so that the stereoscopic image of the preset object appears, through the stereoscopic glasses, at a preset distance from the semi-transparent screen, characterized in that the pair of glasses includes a first filter placed in front of the right eye and a second filter placed in front of the left eye, the first filter transmitting all of the spectrum except for the portion of the spectrum emitted by the light sources below the central wave wavelength and the second filter transmitting all of the spectrum except for the portion of the spectrum emitted by the light sources above the central wave wavelength.

Advantageously, the displaying system includes means for detecting the relative position of the pair of glasses with respect to the position of the semi-transparent screen and means for computing the stereoscopic images so that the position of the stereoscopic image of the object is fixed in a preset coordinate system and is independent of the position of the stereoscopic glasses.

Advantageously, the preset distance is comprised between a few centimetres and optical infinity.

Advantageously, the displaying system is an aircraft cockpit system.

BRIEF DESCRIPTION OF THE DRAWINGS

The invention will be better understood and other advantages will become apparent on reading the following description, which is not intended to be limiting, and by virtue of the appended figures, in which.

DETAILED DESCRIPTION

Figure 4:
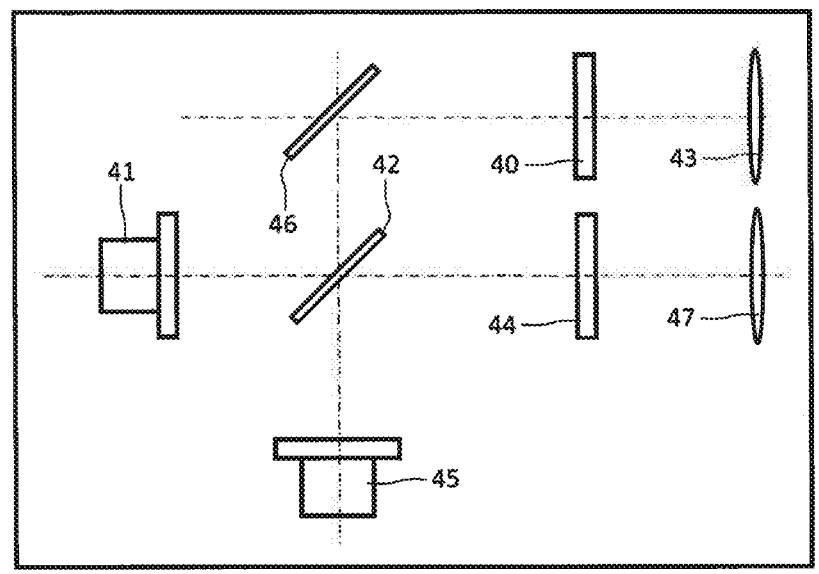
FIG. 4 shows an architecture of a stereoscopic image projector according to the invention.
Figure 5:
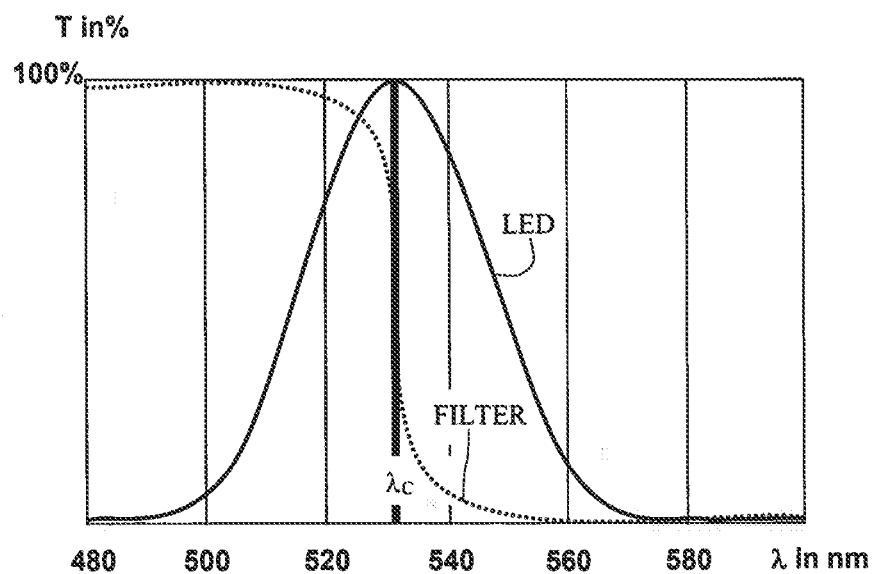
FIG. 5 shows the spectral distribution of the light source and the transmittance of the dichroic separating filter according to the invention.
Figure 6:
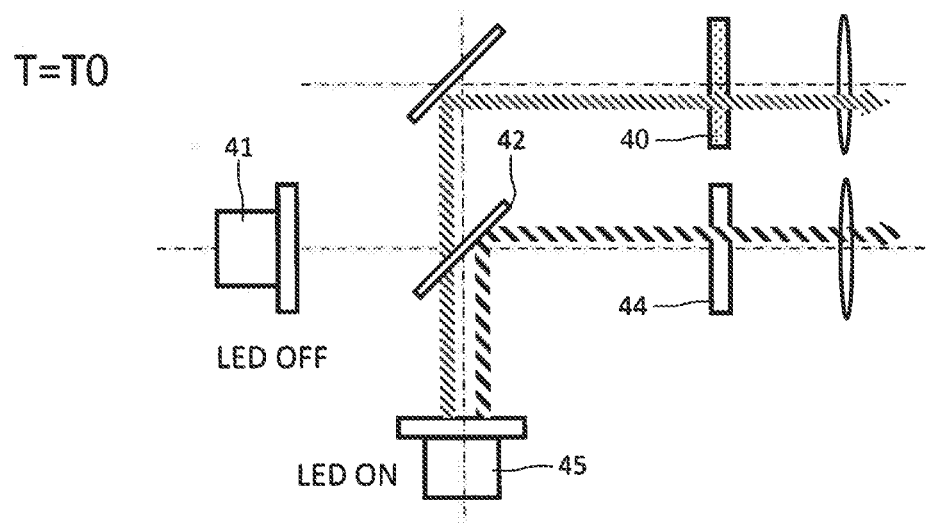
FIGS. 6 and 7 show two alternations of an operating cycle of the stereoscopic image projector according to the invention.
Figure 7:
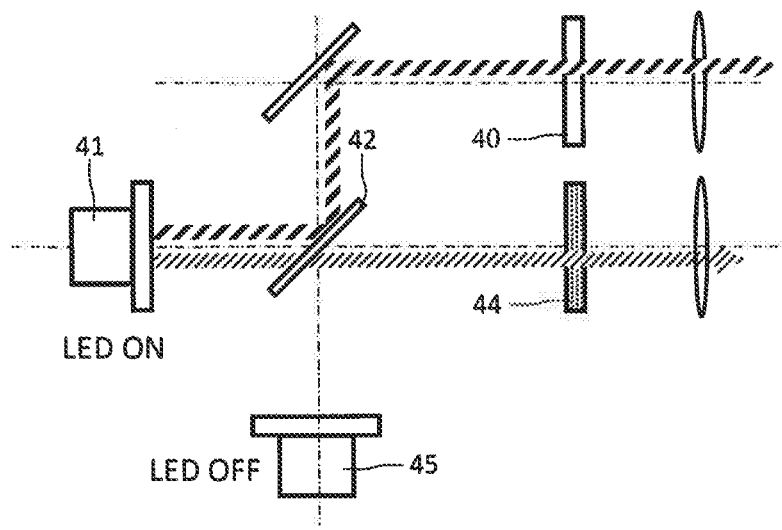

By way of nonlimiting example, FIG. 4 shows an architecture of a stereoscopic image projector according to the invention. It essentially includes:

two light sources 41 and 45 having the same spectral distribution centred on a central wavelength. By way of example, these light sources are light-emitting diodes. FIG. 5 shows an exemplary spectral distribution of the light sources as a function of wavelength. This curve is referenced "LED" in this figure. In this example, the central wavelength $\lambda_C$ is located at about 530 nanometres.

two passive displays 40 and 44 of small dimensions, For the sake of the simplicity of FIGS. 4, 6 and 7, the displays shown operate in transmission. Of course, the system also functions with displays operating in reflection. By way of example, the displays are DMD micromirror displays. Other technologies based on liquid crystals, such as "LCOS" (acronym of "liquid-crystal on silicon") matrix arrays, are also envisageable two sets of projecting optics 43 and 47 allowing the stereoscopic images generated by the two displays 40 and 44 to be projected onto a projection screen.

a dichroic separating filter 42 transmitting the portion of the spectrum emitted by the light sources below the central wavelength and reflecting the portion of the spectrum emitted by the light sources above the central wavelength or vice versa. FIG. 5 shows the transmittance of one dichroic separating filter according to the invention as a function of wavelength. This transmittance is referenced "FILTER" in FIG. 5. Its cut-off wavelength is also located at about 530 nm so as to separate into two the spectrum of the preceding light-emitting diodes.

The first light source 41 and the second light source 45 are arranged symmetrically on either side of the dichroic separating filter 42 and are placed so as to illuminate in the same way the first imager 40 and the second imager 44. The device in FIG. 4 in addition includes an inclined planar mirror 46 the function of which is to align the two optical axes of the projecting optics 43 and 47.

The first imager and the second imager are connected to a generator of pairs of stereoscopic images, each pair comprising what is called a "left" image and what is called a "right" image.

The stereoscopic image projector according to the invention operates in a cyclical mode. Each cycle including two alternations, each alternation has a duration of T/2 and the frequency of the cycle, equal to 1/T, is comprised between 100 Hz and 400 Hz.

in the first alternation illustrated in FIG. 6 and starting at a time referenced T0, the image generator emits a first pair of stereoscopic images including a first left image and a first right image, the first left image being displayed by the first display 40 and the first right image being displayed by the second display 44—the first light source 45 is activated and the second light source 41 is turned off. In this case, the first imager 40 is illuminated by spectral radiation located below the central wavelength and the second imager 44 is illuminated by spectral radiation located above the central wavelength;

in the second alternation illustrated in FIG. 7 and starting at a time denoted T0+T/2, the image generator emits a second pair of stereoscopic images including a second left image and a second right image, the second left image being displayed by the second display 44 and the second right image being displayed by the first display 40—the first light source 45 is turned off and the second light source 41 is activated. In this case, the second imager 44 is illuminated by spectral radiation located below the central wavelength and the first imager 40 is illuminated by spectral radiation located above the central wavelength.

With this operating mode, whatever the alternation, the left stereoscopic image is always emitted by a display illuminated by spectral radiation located below the central wavelength and the right stereoscopic image is always emitted by a display illuminated by spectral radiation located above the central wavelength, the display changing in each alternation.

If an observer is wearing a pair of glasses including a first filter placed in front of the right eye and a second filter placed in front of the left eye, since the first filter transmits the entirety of the spectrum except for the portion of the spectrum emitted by the light sources below the central wave wavelength and the second filter transmits the entirety of the spectrum except for the portion of the spectrum emitted by the light sources above the central wave wavelength, then this observer always sees the left stereoscopic image with his left eye and the right stereoscopic image with his right eye.

This operating mode has a number of advantages. lithe light sources are light-emitting diodes, it is possible to power them in a pulsed mode with a peak current at least two times higher than that of the continuous mode. The light-emitting diodes then emit at least as much light flux as in continuous mode. Moreover, this two-light-source and two-display device is very robust to simple malfunctions. The loss of one source or of one display does not cause the stereoscopic image to disappear.

This stereoscopic image projector is integrated into a displaying system including:
  means for generating stereoscopic images of a preset object,
  a device for displaying said stereoscopic images including:
    the stereoscopic image projector according to the invention operating in cyclical mode;
    a semi-transparent screen;
    a pair of filtering stereoscopic glasses such as described above.

The means for generating stereoscopic images, the displaying device, the semi-transparent screen and the pair of stereoscopic glasses are arranged so that the stereoscopic image of the preset object appears, through the stereoscopic glasses, at a preset distance from the semi-transparent screen.

Figure 1:
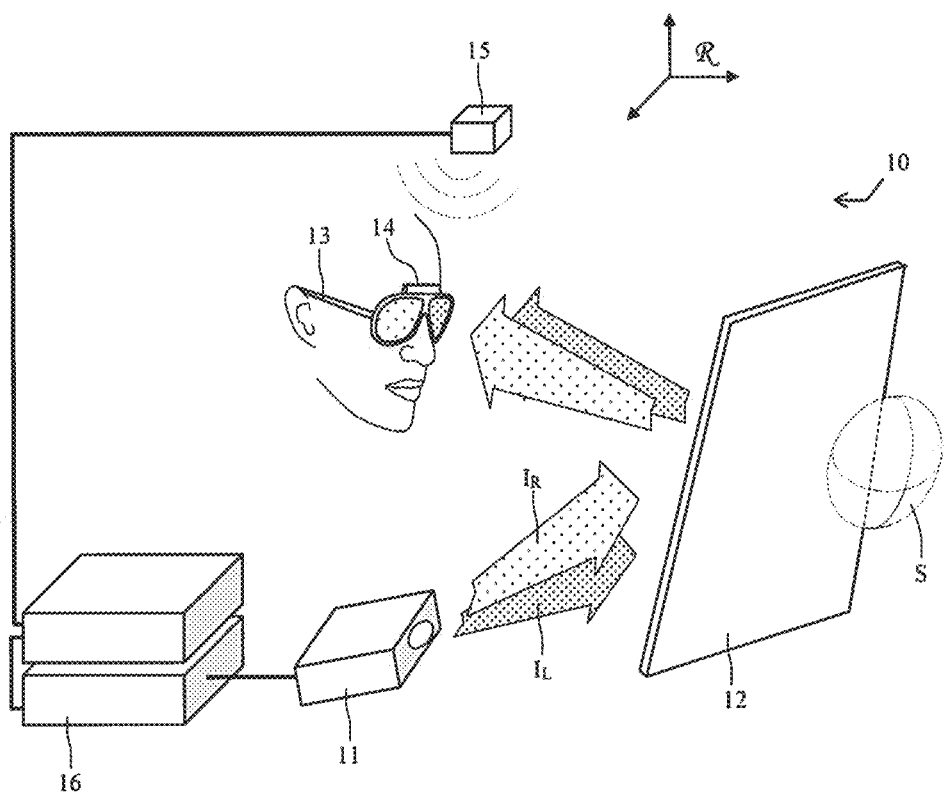
FIG. 1 shows an architecture of a prior-art displaying system.
Figure 2:
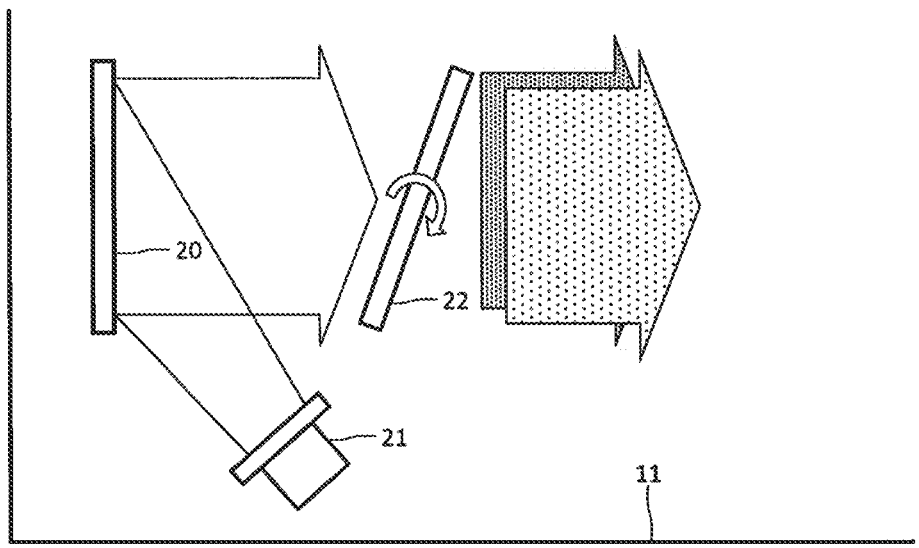
FIG. 2 shows a first prior-art stereoscopic-projector architecture including a single light source.
Figure 3:
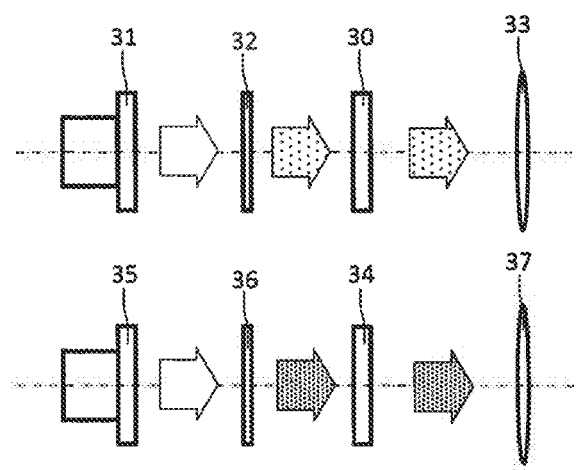
FIG. 3 shows a second prior-art stereoscopic-projector architecture including two light sources.

The system according to the invention may include a system for detecting the position of the pair of glasses. This type of detection conventionally includes two subassemblies, as may be seen in FIG. 1, a first subassembly 14 fastened to the pair of glasses, and a second subassembly 15 placed in a fixed coordinate system. There are various techniques allowing an object to be located in space. It is possible to use electromagnetic detection. An emitter is placed in the fixed coordinate system and a receiver in the mobile coordinate system. It is also possible to use optical detection, which may be passive or active. In the latter case, the pair of glasses bears light-emitting diodes the position of the emission of which is located by video cameras. All these techniques are known to those skilled in the art. They are compatible with real-time operation and are easily adaptable to the displaying system according to the invention.

When the user moves his head, its movements are captured by the detecting means of the pair of glasses. The electronic processor then re-calculates in real time the position of the stereoscopic images so that the user continues to see the virtual image of the object in the same place. To take a simple example, if the virtual image of the object is at infinity, the right eye and left eye stereoscopic images are separated by a distance that is substantially the average interpupillary distance of a human being. Their movement on the display screen is substantially equal to that of the pair of glasses. Thus the sensation of an image at infinity is created.

The technical applications of the displaying system according to the invention are mainly in assistance with the control of vehicles. The invention most particularly applies to the field of aircraft flight-instrument panels, in which the pilot needs to be able to see the exterior and simultaneously read flight-control information and information relating to the navigation of the aircraft.

Application to the field of helicopters is particularly advantageous in so far as helicopters possess large windows and are sometimes required to fly at low altitudes.

What is claimed is:

1. Monochromatic stereoscopic image projector including a first light source, a second light source, a first imager and a second imager, the radiation of the two light sources having the same spectral distribution centred on a central wavelength, the first imager and the second imager being connected to a generator of stereoscopic image pairs, each pair comprising what is called a "left" image and what is called a "right" image;

wherein:
the image projector includes a dichroic separating filter that transmits the portion of the spectrum emitted by the light sources below the central wavelength and that reflects the portion of the spectrum emitted by the light sources above the central wavelength, or vice versa;
the first light source and the second light source are arranged symmetrically on either side of the dichroic separating filter and are arranged so as to illuminate the first and the second imager;
the image projector operates cyclically, each cycle including two alternations,
in the first alternation, the image generator emits a first pair of stereoscopic images including a first left image and a first right image, the first left image being displayed by the first display and the first right image being displayed by the second display, the first light source is activated and the second light source is turned off,
in the second alternation, the image generator emits a second pair of stereoscopic images including a second left image and a second right image, the second left image being displayed by the second display and the second right image being displayed by the first display, the first light source is turned off and the second light source is activated, and
whatever the alternation, the left stereoscopic image is always emitted and the right stereoscopic image is always emitted.

2. Monochromatic stereoscopic image projector according to claim 1, wherein the first light source and the second light source are light-emitting diodes, the central wavelength being located at about 530 nanometres.

3. Monochromatic stereoscopic image projector according to claim 1, wherein the frequency of the cycle is comprised between 100 Hz and 400 Hz.

4. Monochromatic stereoscopic image projector according to claim 1, wherein the first display and the second display are DMD micromirror displays.

5. Displaying system including means for generating stereoscopic images of a preset object, a device for displaying said stereoscopic images including a stereoscopic image projector and a semi-transparent screen and a pair of stereoscopic glasses, the means for generating stereoscopic images, the displaying device, the semi-transparent screen and the pair of stereoscopic glasses being arranged so that the stereoscopic image of the preset object appears, through the stereoscopic glasses, at a preset distance from the semi-transparent screen, wherein the stereoscopic image projector comprises a monochromatic stereoscopic image projector including a first light source, a second light source, a first imager and a second imager, the radiation of the two light sources having the same spectral distribution centred on a central wavelength, the first imager and the second imager being connected to a generator of stereoscopic image pairs, each pair comprising what is called a "left" image and what is called a "right" image;

wherein:
the image projector includes a dichroic separating filter that transmits the portion of the spectrum emitted by the light sources below the central wavelength and that reflects the portion of the spectrum emitted by the light sources above the central wavelength, or vice versa;
the first light source and the second light source are arranged symmetrically on either side of the dichroic separating filter and are arranged so as to illuminate the first and the second imager;
the image projector operates cyclically, each cycle including two alternations,
in the first alternation, the image generator emits a first pair of stereoscopic images including a first left image and a first right image, the first left image being displayed by the first display and the first right image being displayed by the second display, the first light source is activated and the second light source is turned off,
in the second alternation, the image generator emits a second pair of stereoscopic images including a second left image and a second right image, the second left image being displayed by the second display and the second right image being displayed by the first display, the first light source is turned off and the second light source is activated,
the pair of glasses includes a first filter placed in front of the right eye and a second filter placed in front of the left eye, the first filter transmitting all of the spectrum except for the portion of the spectrum emitted by the light sources below the central wave wavelength and the second filter transmitting all of the spectrum except for the portion of the spectrum emitted by the light sources above the central wave wavelength, and
whatever the alternation, the left stereoscopic image is always emitted and the right stereoscopic image is always emitted.

6. Displaying system according to claim 5, wherein the system includes means for detecting the relative position of the pair of glasses with respect to the position of the semi-transparent screen and means for computing the stereoscopic images so that the position of the stereoscopic image of the object is fixed in a preset coordinate system and is independent of the position of the stereoscopic glasses.

7. Displaying system according to claim 5, wherein the preset distance is comprised between a few centimetres and optical infinity.

8. Displaying system according to claim 5, wherein the displaying system is an aircraft cockpit system.

9. Monochromatic stereoscopic image projector according to claim 1, wherein the light sources are light-emitting diodes and their control current is in pulsed mode with a peak current at least two times higher than that of the continuous mode.

10. Displaying system according to claim 5, wherein the light sources are light-emitting diodes and their control current is in pulsed mode with a peak current at least two times higher than that of the continuous mode.

* * * * *